(No Model.)

J. C. WARNER.
ELECTRIC ANNUNCIATOR.

No. 266,405. Patented Oct. 24, 1882.

Witnesses.
Henry Frankfurter,
F. S. Baker.

Inventor.
James C. Warner.
George P. Barton
attorney

UNITED STATES PATENT OFFICE.

JAMES C. WARNER, OF CHICAGO, ILLINOIS, ASSIGNOR, BY MESNE ASSIGNMENTS, TO THE WESTERN ELECTRIC COMPANY, OF SAME PLACE.

ELECTRIC ANNUNCIATOR.

SPECIFICATION forming part of Letters Patent No. 266,405, dated October 24, 1882.

Application filed June 8, 1882. (No model.)

*To all whom it may concern:*

Be it known that I, JAMES C. WARNER, a citizen of the United States, residing at Chicago, in the county of Cook and State of Illinois, have invented a certain new and useful Improvement in Electric Annunciators, of which the following is a full, clear, concise, and exact description, reference being had to the accompanying drawings, forming a part of this specification.

My invention relates to electric annunciators; and it consists in improvements in supporting the armature and arranging the electro-magnets and drops upon the iron plate which forms the frame.

Figure 1:
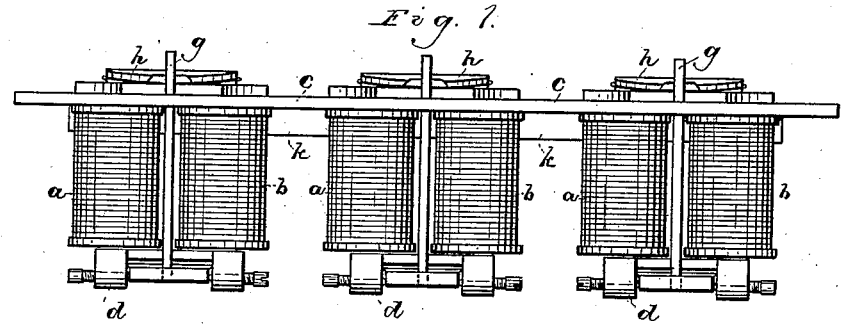
Figure 2:
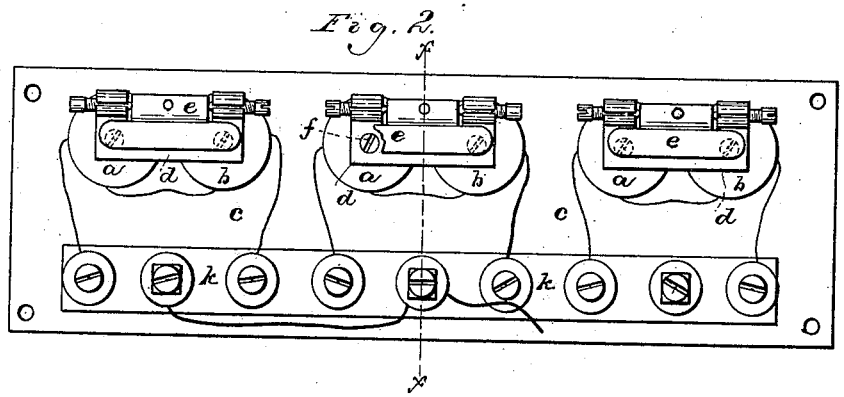
Figure 3:
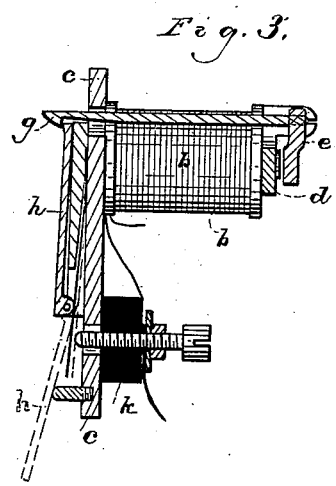

Figure 1 is a top view of the annunciator. Fig. 2 is a rear view thereof. Fig. 3 is a detail section upon line $x\ x$ of Fig. 2.

Like parts are indicated by similar letters of reference.

The spools $a\ b$ of the electro-magnets are attached to the iron plate $c$, which serves as the heel-bar to the whole system. The brass supports $d$, to which the armatures $e$ are pivoted, are attached directly to the spools by means of the screws $f$, which form the poles. The armature-levers $g$ extend forward through the slots provided in the iron plate. It will thus be seen that a slight motion of the armature $e$ will raise the lever $g$ sufficiently to release the shutter $h$. A strip, $k$, of insulating material is attached to the rear of the iron plate under each row of electro-magnets. The iron plate forms the common ground.

Annunciators provided with my improvements are especially adapted for use in the telephone-line circuits at the central office of a telephone-exchange system.

I claim—

1. The combination of the electro-magnets with the iron plate forming the common heel-bar and ground-connection, the brass supports attached directly to the spools, the armatures and levers extending through the slots to the shutters, substantially as and for the purposes specified.

2. The combination of the brass piece with the armature pivoted thereto, and iron screws attaching said brass piece directly to the cores and forming the poles thereof, substantially as and for the purpose specified.

In witness whereof I hereunto subscribe my name this 24th day of May, A. D. 1882.

JAMES C. WARNER.

Witnesses:
 GEORGE P. BARTON,
 F. S. BAKER.